(12) United States Patent
Berkovitz et al.

(10) Patent No.: US 9,171,117 B2
(45) Date of Patent: Oct. 27, 2015

(54) METHOD FOR RANKING PATHS FOR POWER OPTIMIZATION OF AN INTEGRATED CIRCUIT DESIGN AND CORRESPONDING COMPUTER PROGRAM PRODUCT

(75) Inventors: Asher Berkovitz, Kyriat Ono (IL); Gal Malach, Gedera (IL); Eytan Weisberger, Beit Halevi (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/003,361

(22) PCT Filed: Mar. 28, 2011

(86) PCT No.: PCT/IB2011/051292
§ 371 (c)(1),
(2), (4) Date: Sep. 5, 2013

(87) PCT Pub. No.: WO2012/131427
PCT Pub. Date: Oct. 4, 2012

(65) Prior Publication Data
US 2014/0013294 A1    Jan. 9, 2014

(51) Int. Cl.
*G06F 17/50* (2006.01)

(52) U.S. Cl.
CPC ........ *G06F 17/5068* (2013.01); *G06F 17/5022* (2013.01)

(58) Field of Classification Search
CPC .................................................. G06F 2217/78
USPC ....................................................... 716/133
See application file for complete search history.

(56) References Cited

U.S. PATENT DOCUMENTS

| | | |
|---|---|---|
| 5,673,200 A | 9/1997 | Toyonaga et al. |
| 6,396,307 B1 | 5/2002 | Kawakami et al. |
| 6,449,761 B1 * | 9/2002 | Greidinger et al. ........... 716/122 |
| 6,526,562 B1 * | 2/2003 | Haddad et al. ................ 716/104 |
| 7,007,247 B1 | 2/2006 | Wang et al. |
| 7,551,985 B1 | 6/2009 | Chen et al. |
| 7,689,940 B2 * | 3/2010 | New et al. ...................... 716/133 |
| 2004/0031008 A1 | 2/2004 | Satoh et al. |
| 2008/0104552 A1 | 5/2008 | Yamada |

FOREIGN PATENT DOCUMENTS

CN    1143860 A    2/1997

OTHER PUBLICATIONS

International Search Report and Written Opinion correlating to PCT/IB2011/051292 dated Nov. 29, 2011.

(Continued)

*Primary Examiner* — Jack Chiang
*Assistant Examiner* — Brandon Bowers

(57) ABSTRACT

The invention pertains to a method for ranking paths for power optimization of an integrated circuit design, comprising identifying a plurality of paths of the integrated circuit design, each path comprising one or more instances of electronic devices providing an instance power estimate for each instance in the identified paths providing, for each identified path, at least one weighted power estimate based on the instance power estimates for instances in the path, and providing a ranking of the paths based on the least one weighted power estimate. The invention also pertains to a corresponding computer program product.

20 Claims, 3 Drawing Sheets

(56) References Cited

OTHER PUBLICATIONS

Jingye Xu et al: "Analysis of Power Consumption and BER of Flip-flop Based Interconnect Pipelining", Design, Automation & Test in Europe Conference & Exhibition, Apr. 16-20, 2007, pp. 1-6.

Andy Lambrechts et al: "Power Breakdown Analysis for a Heterogeneous NoC Platform Running a Video Application", Application-Specific Systems, Architecture Processors, 16th IEEE International Conference, Jul. 23-25, 2005, pp. 179-184.

Wroblewski, A. et al., "Automated Transistor Sizing Algorithm for Minimizing Spurious Switching Activities in CMOS Circuits", IEEE International Symposium on Circuits and Systems, May 28-31, 2000, Geneva, Switzerland, vol. 3, pp. 291-294.

\* cited by examiner

METHOD FOR RANKING PATHS FOR POWER OPTIMIZATION OF AN INTEGRATED CIRCUIT DESIGN AND CORRESPONDING COMPUTER PROGRAM PRODUCT

FIELD OF THE INVENTION

This invention relates to a method for ranking paths for power optimization of an integrated circuit design and a corresponding computer program product.

BACKGROUND OF THE INVENTION

The development of integrated circuits, in particular for microprocessors, systems on a chip, digital signal processors (DSP) and similar highly integrated devices, leads to increasingly complex designs with an increasing number of semiconductor devices arranged on smaller and smaller surfaces. Such integrated devices are usually optimized to fulfil predefined timing requirements. However, in particular in the context of mobile devices becoming more and more ubiquitous and the drive for more efficient and cheaper use of energy in large computing centres, it has become desirable to increase the power efficiency of designs of integrated circuits. Due to the complex nature of such circuits, it is often difficult to identify structures which potentially might be power optimized.

SUMMARY OF THE INVENTION

The present invention provides a method for ranking paths for power optimization of an integrated circuit design and a corresponding computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
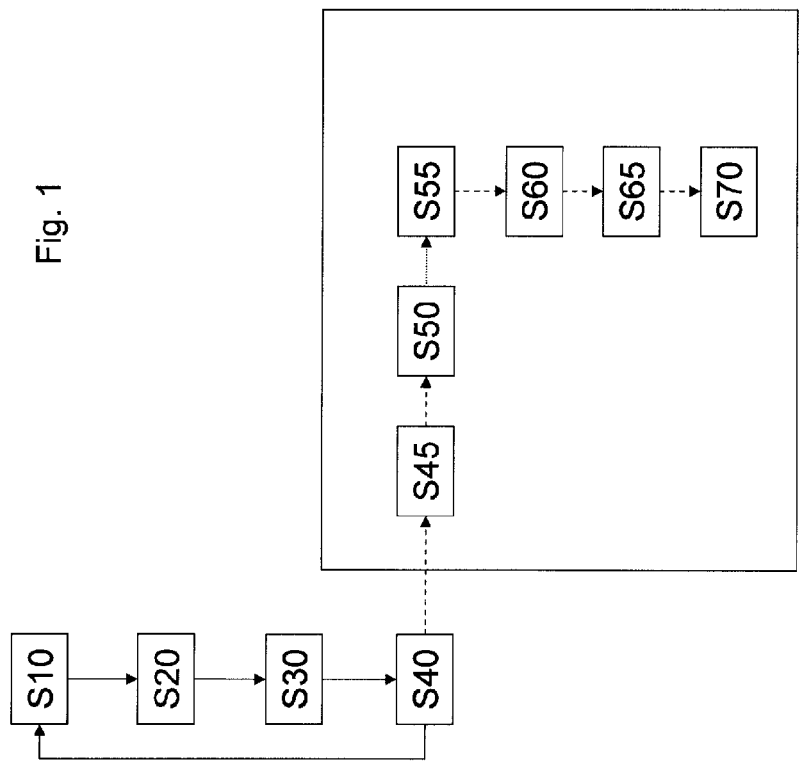
FIG. 1 schematically shows a flow-chart of an example of a method for ranking paths for power optimization of an integrated circuit design as part of a method for power optimizing an integrated circuit design.

Because the illustrated embodiments of the present invention may for the most part, be implemented using electronic components, circuits and software known to those skilled in the art, details will not be explained in any greater extent than that considered necessary, for the understanding and appreciation of the underlying concepts of the present invention and in order not to obfuscate or distract from the teachings of the present invention.

In the context with this application, an integrated circuit design may represent an integrated circuit, in particular during a design phase. The integrated circuit may be a synchronous circuit. The integrated circuit design can be stored as data of a development software tool, and is not necessarily physically implemented. For example, the integrated circuit design may be implemented as a software or code representation of physical circuitry, such as in a hardware description language of appropriate type. The representation may for example be stored as data readable by an apparatus able to run a simulation program. When the data is read by the apparatus running the program, the apparatus performs the function of the integrated circuit. Any number of semiconductor and/or electronic devices may be contained in the integrated circuits design. An integrated circuit design may be mapped in different kinds of representations. In particular, an integrated circuit design may be mapped as a Gate Level (GL) or Register Transfer Level (RTL) representation. In such a representation, registers and data paths running to and from registers or register sets as well as instances of electronic devices connected to the registers may be shown. An input or output of an integrated circuit may be considered to be a connection via which the integrated circuit represented by the design may be connected to further electronic or electric devices. A representation of an integrated circuit design may be used by suitable development software. Such software may be software for timing optimization of a circuit design, or any other type of semiconductor design/analysis software.

A register may represent a gate or gate arrangement with memory elements such as, but not limited to, a flip flop, in particular a D-type flip-flop. A register may have one or more inputs, and one or more outputs. A register or register set may be arranged to store data, in particular to store one or more data bits.

An instance may generally represent any kind of semiconductor device included in the integrated circuit, such as one or more transistors and/or active devices. An instance can e.g. represent a logic gate, a buffer, a register of any kind, a sample stage and similar devices. A logic gate may for example be an AND, OR, NOT, XOR, XNOR, NAND, NOR gate, a combination of such gates or a gate with a similar logic function.

A path of the integrated circuit design may represent a connection suitable for data transmission between a start point and an end point. A start point may be an input of the integrated circuit design or an output of a register, in particular an output of a flip-flop. An end point of a path may be an output of the integrated circuit design or an input of a register, in particular an input of a flip-flop. A path may for example connect a register to a register, a register to an input or output of the integrated circuit design or an input of the integrated circuit design with an output of the integrated circuit design. A path may comprise one or more instances. An instance may be part of more than one path. A path may be considered to begin or end where it is connected to a register or an input or output of the integrated circuit design. Thus, a path between two registers does not necessarily include the registers it connects and/or a path does not necessarily include registers. However, it is possible to include one or more registers into a path, leading to a lower number of longer paths defined for the integrated circuit design. An input of the integrated circuit design or a register output may be connected via one or more paths to one or more register inputs and/or outputs of the integrated circuit design. Lines in a path may branch off, such that different paths are formed, which may run from one start point to different end points or run via different instances from one common start point to one common end point. Paths of the integrated circuit design may be identified and/or provided by software, in particular by timing optimization software. Such software may provide paths based on and/or in a RTL or GL representation of the integrated circuit. Suitable timing optimization software can e.g. be static timing analysis software, which usually works in RTL or GL representation.

A method for detecting paths for power optimization of the integrated circuit design may be performed after a timing optimization has been performed on the integrated circuit design. It should be noted that in this context the term 'optimization' refers to an effort to improve, and that this does not necessarily mean that the 'optimized' device is improved or optimal.

A critical path may be defined as the path or paths out of one or more paths sharing the same start point and end point having a maximum delay. Thus, if there are multiple paths connecting the same start point with the same end point, a critical path may have the highest delay. It may occur that there is more than one critical path connecting the same start point with the same end point. Critical paths are usually treated with particular consideration during timing optimization and timing analysis. It may be contemplated that after timing optimization, critical paths have a similar delay, which may be the maximum delay or slack allowed according to timing optimization requirements.

For an instance, a power estimate may be provided. Such a power estimate may be called an instance power estimate. The power estimate for an instance may be based on a physical test of the corresponding instance. An instance power estimate may refer to an instance-based gate-level power estimate. An instance power estimate may be a statistical estimate, for example an instance-based statistical power estimate. Library data may be used to provide an instance power estimate. A static power consumption estimate may be provided for an instance power estimate. Library data may provide statistical data for an instance power estimate. An instance power estimate for a given instance may be based on one or more such estimates. Instance power estimates for different instances may be based on different approaches of power estimation.

A method for ranking paths or determining paths for power optimization of an integrated circuit design may comprise identifying a plurality of paths of the integrated circuit design, each path comprising one or more instances of electronic devices. A thus identified path may be a critical path or a non-critical path. Identifying the plurality of paths may be performed by software, for example timing analysis software. The integrated circuit design may be represented as RTL or GL design. Providing an instance power estimate for instances in the identified paths may be performed, for example by suitable software. For each path there may be provided at least one weighted power estimate based on the instance power estimates for instances in the path. This may be performed for example by software as well. The software may be the same software providing an instance power estimate, may be connected to such software by a suitable interface or may work on data provided by such software. Generally, a weighted power estimate P for an individual path may be calculated by performing an operation which may be described with the mathematical formula:

$$P = \sum_i a_i f(p_i), \quad (1)$$

wherein i indicates a counting number of the instance in the path, $a_i$ is a weighting coefficient given to this instance i, and $f(p_i)$ corresponds to the instance power estimate for instance i. $f(p_i)$ may indicate any function of e.g. a power of $p_i$ like $p_i^2$ or any form of a polynomial in $p_i$.

The method may also comprise providing a ranking of the paths based on the at least one weighted power estimate. Providing the ranking may be performed to determine candidate paths for power optimization and/or to determine paths for power optimization. Providing the ranking may also be performed by suitable software as mentioned above. The higher the value of the weighted power estimate the ranking is based on for a path is, the higher a path may be ranked. Providing an instance power estimate or weighted power estimate for a path may comprise generating and/or calculating a corresponding estimate. To this purpose, data regarding instances may be accessed and/or retrieved and/or processed. The at least one weighted power estimate may comprise at least one of a distance weighted power estimate, a logic distance weighted power estimate and/or a timing rate power estimate. To be comparable, paths to be ranked based on the at least one weighted power estimate may be ranked based on the same weighted power estimate. Paths may be ranked according to more than one weighted power estimate. Critical paths may be given a low rank by the at least one weighted power estimate. In particular, different rankings based on different weighted power estimates may be provided. A ranking may be performed such that top-ranked paths are considered to be candidate paths for power optimization.

Absolute and/or relative differences of the weighted power estimates of ranked paths may be taken into account. For example, if paths of decreasing ranks have only slightly different values of their estimate, they might be considered to be almost equally ranked.

The method may further comprise optimizing at least one of the ranked paths for power utilization. Including this the method may be considered to be a power optimization method for an integrated circuit design. To power optimize a path determined for power optimization, one or more sampling stages may be added to one or more paths in the design. A sampling stage may comprise a driver and/or a buffer connected to a clock signal of the integrated circuit design.

A timing optimizing of the integrated circuit design may be performed. It may be considered to perform the timing optimizing before identifying the plurality of paths and/or identifying the plurality of paths during timing optimizing.

The method may be performed on a Register Transfer Level representation of the integrated circuit design. Identifying a plurality of paths may comprise identifying a plurality of non-critical paths. The method may be considered to be a static method, in particular a static power analysis method. However, individual instance power estimates may be considered to take into account dynamic power requirements and/or dynamic behaviour of an instance. There may be considered a computer program product stored on a computer-readable medium, comprising instructions for a computer system to perform the described method.

FIG. 1 shows a flow chart of an example for a method for power optimization of an integrated circuit design, which includes stages of a method of ranking paths for power optimization. In S10, an integrated circuit design may be provided, for example a RTL design. Based on the design provided, in S20, a backend flow may be performed, in which for example a GL netlist is created and/or power domains or necessary supply voltages may be analysed. Generally, during any stage of the method a mapping of a RTL design into a GL representation may be performed. Subsequently, at S30 an overall power estimation of the RTL or GL design may be provided. After S30, in S40 a path analysis for ranking paths for power optimization may be performed. S40 may comprise several sub-stages. For example, in S45, a plurality of paths of the integrated circuit design may be identified. The integrated circuit and/or the paths may be mapped in a GL or RTL representation. Identifying such paths may comprise providing information about paths to suitable software. Based on the paths identified in S45, in S50 for each instance in the plurality of paths an instance power estimate may be provided. Optionally, the corresponding information or estimates may be provided in a preceding stage, for example in S30. In this event, S50 may be omitted. Following S50 or S45, in S55 for each path at least one weighted power estimate may be provided based on the instance power estimates for instances in the path. There may be provided different weighted power estimates for individual paths. Subsequently, in S60 a ranking of the paths based on the at least one weighted power estimate may be performed to rank paths for power optimization. There may be provided more than one ranking based on different weighted power estimates. Based on such ranking, good candidate paths for power optimization may be determined or identified. Accordingly, in S65, the top-ranked paths may be checked whether power optimization may be performed efficiently. Determining which path to check for power optimization based on the ranking and/or checking may be performed automatically by software, manually by a designer or semi-automatically. If one or more of the paths determined to be candidates for power optimization are to be optimized, the integrated circuit design may be suitable amended in S70. For example, suitable sampling stages may be introduced into the path. Amendments to the design may also be performed manually, automatically or semi-automatically. After the paths determined for power optimization have been checked and/or optimized, it may be returned from S40 or S70 to S10 with the amended integrated circuit design being provided for a new iteration of the method. If no further optimization of paths has been performed in S70, optimization may be considered to be complete and the method may provide the current integrated circuit design as power optimization result.

Figure 2:
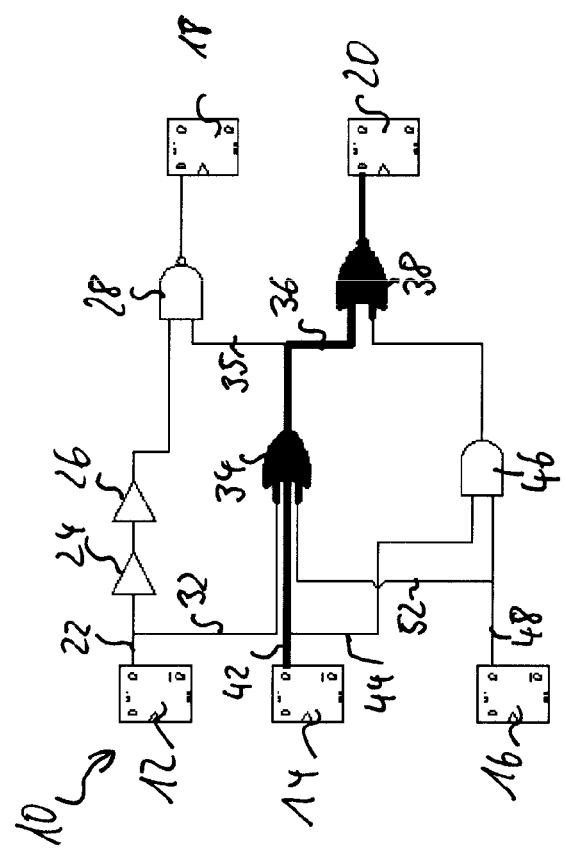
FIG. 2 shows a block diagram of an example of an integrated circuit design in Register Transfer Level representation with the most power consuming path marked.

FIG. 2 shows as an example of a GL representation of an integrated circuit design. The integrated circuit 10 represented may comprise a first register 12, a second register 14 and a third register 16, which may be considered to belong to a first register set. There may be provided a fourth register 18 and a fifth register 20, which may belong to a second register set. In this example, each of the registers 12, 14, 16, 18 and 20 may be implemented as a flip-flop, in particular as a D-type flip-flop. However, any semiconductor element suitable as a register may be used. It should be noted that different registers may be of different types of semiconductor devices. An output of first register 12 may be connected to a line 22. Line 22 may be connected via a first buffer 24 and a second buffer 26 to a first input of a logic gate 28, which in this example may be implemented as a NAND gate. The output of NAND gate 28 may be connected to an input of the fourth register 18. In the shown example, a first path thus runs from the output of the first register 12 via the stages 24 and 26 and the NAND gate 28 to the input of register 18.

Between the first stage 24 and the output of the first register 12, a line 32 may branch off from line 22. Line 32 may be connected to a first input of a logic gate 34. Logic gate 34 may be an OR gate with three inputs. The output of logic gate 34 may be connected via a branch 35 to a second input of logic gate 28. A different branch 36 may connect the output of logic gate 34 with a first input of a logic gate 38, which may be implemented as an XNOR gate. The output of logic gate 38 may be considered to be connected to the input of the fifth register 20. Thus the first register 12 is connected by a second path, running via lines 22, 32 and logic gates 34 and 28, to the fourth register 18. A third path running via lines 22, 32 and logic gates 34 and 38 may be considered to connect the first register 18 to the fifth register 20.

The second register 14 may be connected via a line 42 to a second input of OR gate 34. Correspondingly, it may be considered that a fourth path running from the output of the second register 14 via the line 42 and logic gates 34 and 28 to the fourth register 18 is provided. A fifth path may be contemplated to connect the second register 14 to the fifth register 20 via gates 34 and 38.

A line 44 may branch of line 42 between the output of the second register 14 and logic gate 34, connecting the output of the second register 14 to a further logic gate 46, which may be implemented as an AND gate. The output of gate 46 may be connected to a second input of gate 38. Thus, a sixth path can be defined, connecting the output of the second register 14 via line 44 and gates 46 and 38 with the input of register 20.

The output of the third register 16 may be connected via a line 48 to a second input of AND gate 46. Thus, it may be considered that a seventh path connects the output of third register 16 via line 48 and gates 46 and 38 to the input of the fifth register 20.

A line 52 may branch off line 48 between the output of the third register 16 and the input of gate 46. Line 52 may connect the output of the third register 16 with a third input of gate 34. Accordingly, it may be contemplated that an eighth path connects the output of the third register 16 via line 52 and gates 34 and 28 to the input of the fourth register 18. Via line 52 and gates 34 and 38, the output of the third register 16 may be considered to be connected to the input of the fifth register 20, defining a ninth path.

As may be seen, even for a relatively small part of a circuit design, a significant number of different paths may exist. It should be noted that the design shown is only an example for a GL design with a plurality of paths and is not to be considered to be able to perform a specific task. The logic gates and buffers 24, 26, 28, 34, 38 and 46 may be considered to be instances of the design included in the paths mentioned above. It should be noted that each instance may generally be part of more than one path. In this example, the registers 12, 14, 16, 18 and 20 are not to be considered parts of the paths, but they may be considered to define not included start and end points of the paths.

In this example, buffers 24 and 26 may be assigned an instance power estimate of 1 nW each. The instance power estimates for gates 28 and 46, namely a NAND gate and an AND gate, may be 1.5 nW each. Gate 34, implemented as an OR gate with three inputs, may have an instance power estimate of 5 nW. For gate 38, the instance power estimate may provide a value of 3 nW.

A first weighted power estimate for a path may be provided by setting all weighting coefficients to 1. Thus, the first weighted power estimate gives the sum of the instance power estimates for each path.

Figure 3:
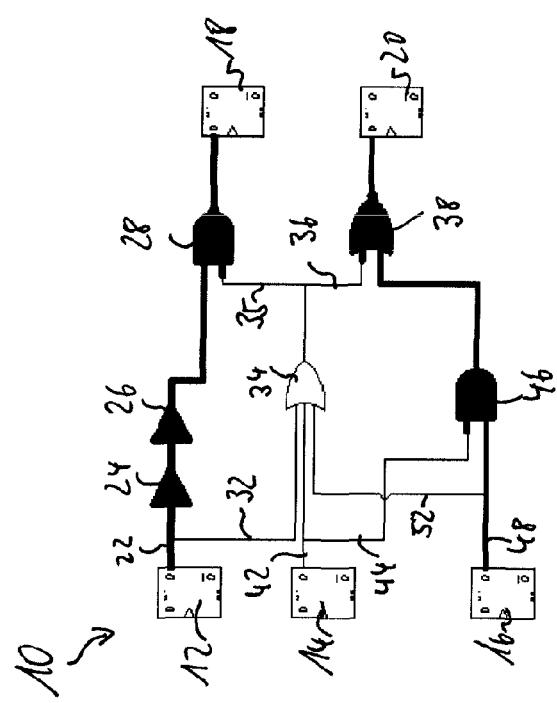
FIG. 3 shows the example of FIG. 2 with different paths marked.

Marked with bold lines in FIG. 2 is the path with the top-ranked first weighted power estimate, namely the path in which the sum of the instance power estimates for the instances in the path is the highest. In this case, the paths running via gates 34 and 38 are ranked top, namely the third, fifth and ninth paths, all having a weighted power estimate of 8 nW. These paths may also be considered to be critical paths, as they comprise the most complicated and complex instances. Ranked second are the paths running via gates 34 and 28, the second, fourth and eights paths, which have a weighted power estimate of 6.5 nW each. The sixth and seventh paths running via instances 46 and 38 and having a first weighted power estimate of 4.5 nW may be considered to be the third ranking paths. The first path does not appear in the top ranks, as its first weighted power estimate is the lowest with 3.5 nW. Thus, according to this approach, the first path is not identified as a good candidate for power optimization, but the critical paths running via the gates 34 and 38 might be. With this weighted analysis, it may be difficult to differentiate between "real" and "synthesis"-created paths with high power consumption. To easier identify different paths as potentially worthy objects of power optimization, like for example the paths shown bold in FIG. 3, it may be advantageous to use different weighted power estimate to provide a different ranking.

For example, a distance weighted estimate may be utilized. A distance weighted estimate D may be determined by the following formula:

$$D = \frac{1}{I} \cdot \sum_i p_i, \quad (2)$$

wherein I indicates the total number of instances in the path. In this case, the coefficients $a_i$ of the above-mentioned general weighted power estimate may be considered to be set to 1/I. With this method, short paths consuming a high and/or excessive amount of power may be identified by receiving a high rank. While for the example shown in FIGS. 2 and 3, the ranking of paths does not change, it can be seen that the long first path is even more distant from the higher-ranked paths, due to it comprising three instances as opposed to two instances in the other paths. The weighted power estimates in decreasing order result in 4 nW, 3.25 nW, 2.25 nW and 1.17 nW, respectively. Thus, the relative estimate value distance of the weighted estimate for the first path to the higher ranked paths is larger than in the case of the first weighted power estimate described above. The distance weighted power estimate may be interpreted as an average power per instance of a path.

There may be utilized a logic distance weighted power estimate. In this case, each instance may be assigned a predetermined complexity number. A logic distance weighted estimate L of a path may be written as:

$$L = \sum_i \frac{p_i}{c_i}, \quad (3)$$

wherein $c_i$ indicates a complexity of instance i in the corresponding path. Such a complexity number $c_i$ may for example be the number of input ports of the given instance. Correspondingly, for example buffers and/or inverters may be assigned a complexity of 1, whereas for example adding stages or AND/NAND gates with two inputs may be considered to have a complexity of 2. In the circuit design shown in FIGS. 2 and 3, the OR gate 34 for example may have a complexity number of 3, as it has three input ports. The buffers 24 and 26 may be assigned a complexity number of 1 each, whereas gates 28, 38 and 46 may be assigned a complexity number of 2. Applying this long distance weighted estimate leads to L=2.75 nW for the first path, whereas the paths running via the gates 34 and 38 have L=3.17 nW. The paths including gates 34 and 28 have L=2.42 nW, thus they are ranked lower than the first path. This approach tends to identify or rank high paths that are not logically complex, but are heavily optimized due to timing issues. Such paths may be improved by adding sampling stages. On the other hand, a path critical by necessity usually includes a plurality of instances which high complexity and is not easily optimized. Thus, they will be ranked comparatively low. It may be considered to provide a logic distance weighted power estimate in which the first weighted power estimate is divided by the sum of complexity values for a given path instead of evaluating each instance individually.

The method may comprise a timing weighted power estimate taking into account timing data of instances. Timing data for an instance may be an estimate and may be provided analogously to instance power estimates. According to this approach, a weighted power estimate T may be written as $$T = \sum_i \frac{p_i}{s_i}, \quad (4)$$

wherein $s_i$ represents the time a signal needs to propagate through the instance i in the path. With this approach, paths including instances with short propagation times and correspondingly high power consumption may be ranked high, indicating the possibility of power optimization by providing instances with longer propagation times instead. It may be considered to provide a timing weighted power estimate in which the first weighted power estimate is divided by the sum of the values $s_i$ for a given path instead of evaluating each instance individually. Such a timing weighted power estimate may be interpreted as an average power per time for the paths. It may also be considered that a timing weighted power estimate is derived by dividing the first weighted power estimate, namely the sum of instance power estimates of instance in the path, by the total slack of the path. The slack associated with a path may be interpreted as the difference between the required time and the arrival time of a signal running via the path and is optimized during timing optimization.

It should be recognized that the simple circuit example chosen to exemplify the inventive idea only shows the tendencies of the different weighted power estimates to produce different rankings. For longer and more complex circuits, these tendencies will result in significantly differing rankings.

The invention may also be implemented in a computer program or computer program product for running on a computer system, at least including code portions for performing stages of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective instances, nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for ranking paths for power optimization of an integrated circuit design, comprising:
   identifying, by a computer system, a plurality of paths of the integrated circuit design, each path comprising one or more instances of electronic devices;
   providing an instance power estimate for each instance in the identified paths;
   providing, for each identified path, at least one weighted power estimate based on the instance power estimates for instances in the path;
   providing a ranking of the paths based on the least one weighted power estimate, wherein the at least one weighted power estimate comprises at least one of:
   (a) a distance weighted power estimate for each path calculated as $$D = \frac{1}{I} \cdot \sum_i p_i$$

wherein pi corresponds to the instance power estimate of instance i in the path and I corresponds to the total number of instances in the path;
   (b) a logic distance weighted power estimate for each path calculated as $$L = \sum_i \frac{p_i}{c_i}$$

wherein pi corresponds to the instance power estimate of instance i in the path and ci corresponds to a predetermined complexity value assigned to instance I; and
(c) a timing weighted power estimate for each path calculated as $$T = \sum_i \frac{p_i}{s_i}$$

wherein pi corresponds to the instance power estimate of instance i in the path and si corresponds to the time a signal needs to propagate through instance i; and
producing an integrated circuit based on the ranking of the paths in the integrated circuit design.

2. The method of claim 1, further comprising optimizing at least one the ranked paths for power utilization.

3. The method of claim 1, further comprising adding one or more sampling stages to a path determined for power optimization.

4. The method of claim 1, wherein critical paths are given a low rank by the at least one weighted power estimate.

5. The method of claim 1, wherein the paths are ranked according to more than one weighted power estimate.

6. The method of claim 1, wherein the at least one weighted power estimate is the distance weighted power estimate.

7. The method of claim 1, wherein the at least one weighted power estimate is the logic distance weighted power estimate.

8. The method of claim 1, wherein ci corresponds to a number of inputs of instance i in the path, defining a complexity value assigned to instance i.

9. The method of claim 1, wherein the at least one weighted power estimate is the timing weighted power estimate.

10. The method of claim 1, further comprising a timing optimizing of the integrated circuit design.

11. The method of claim 1, the method being performed based on a Register Transfer Level representation of the integrated circuit design.

12. The method of claim 1, wherein identifying a plurality of paths comprises identifying a plurality of non-critical paths.

13. A non-transitory computer-readable medium, comprising instructions, that when executed by a computer system perform a method for ranking paths for power optimization of an integrated circuit design, the method comprising:
identifying a plurality of paths of the integrated circuit design, each path comprising one or more instances of electronic devices;
providing an instance power estimate for each instance in the identified paths;
providing, for each identified path, at least one weighted power estimate based on the instance power estimates for instances in the path, and providing a ranking of the paths based on the least one weighted power estimate;
wherein the at least one weighted power estimate comprises at least one of:

(a) a distance weighted power estimate for each path calculated as $$D = \frac{1}{l} \cdot \sum_i p_i$$

wherein pi corresponds to the instance power estimate of instance i in the path and I corresponds to the total number of instances in the path;
(b) a logic distance weighted power estimate for each path calculated as $$L = \sum_i \frac{p_i}{c_i}$$

wherein pi corresponds to the instance power estimate of instance i in the path and ci corresponds to a predetermined complexity value assigned to instance I; and
(c) a timing weighted power estimate for each path calculated as $$T = \sum_i \frac{p_i}{s_i}$$

wherein pi corresponds to the instance power estimate of instance i in the path and si corresponds to the time a signal needs to propagate through instance i; and
producing an integrated circuit based on the ranking of the paths in the integrated circuit design.

14. The computer readable medium of claim 13, wherein the method further comprises optimizing at least one the ranked paths for power utilization.

15. The computer readable medium of claim 13, wherein the method further comprises adding one or more sampling stages to a path determined for power optimization.

16. The computer readable medium of claim 13, wherein critical paths are given a low rank by the at least one weighted power estimate.

17. The computer readable medium of claim 13, wherein the paths are ranked according to more than one weighted power estimate.

18. The method of claim 13, wherein the at least one weighted power estimate is the distance weighted power estimate.

19. The method of claim 13, wherein the at least one weighted power estimate is the logic distance weighted power estimate.

20. The method of claim 13, wherein the at least one weighted power estimate is the timing weighted power estimate.

* * * * *